United States Patent
Dreyer et al.

(10) Patent No.: US 12,490,667 B2
(45) Date of Patent: Dec. 9, 2025

(54) METHOD FOR MATCHING THE OPERATION OF AN INDIVIDUALIZING DEVICE AND THE OPERATION OF A PORTIONING DEVICE TO EACH OTHER

(71) Applicant: AMAZONEN-WERKE H. DREYER SE & CO. KG, Hasbergen (DE)

(72) Inventors: Justus Dreyer, Osnabrueck (DE); Stefan Jan Johannaber, Lienen (DE); Stephan Teckemeyer, Lotte (DE); Florenz Hilbert, Emsdetten (DE); Markus Trentmann, Wallenhorst (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 269 days.

(21) Appl. No.: 18/039,904

(22) PCT Filed: Dec. 2, 2021

(86) PCT No.: PCT/EP2021/084071
§ 371 (c)(1),
(2) Date: Jun. 1, 2023

(87) PCT Pub. No.: WO2022/128518
PCT Pub. Date: Jun. 23, 2022

(65) Prior Publication Data
US 2024/0016079 A1    Jan. 18, 2024

(30) Foreign Application Priority Data
Dec. 17, 2020   (DE) .......................... 102020133887.2

(51) Int. Cl.
*A01C 7/10*     (2006.01)
*A01C 7/04*     (2006.01)

(52) U.S. Cl.
CPC .............. *A01C 7/107* (2013.01); *A01C 7/046* (2013.01); *A01C 7/105* (2013.01)

(58) Field of Classification Search
CPC ......... A01C 7/107; A01C 7/046; A01C 7/105; A01C 7/18; A01C 21/005; A01C 7/06
See application file for complete search history.

(56) References Cited

U.S. PATENT DOCUMENTS

| | | | |
|---|---|---|---|
| 5,790,428 A | 8/1998 | Easton et al. | |
| 7,726,251 B1 | 6/2010 | Peterson et al. | |

(Continued)

FOREIGN PATENT DOCUMENTS

| | | |
|---|---|---|
| AU | 2013204455 A1 | 3/2014 |
| DE | 102018120064 A1 | 2/2020 |

(Continued)

OTHER PUBLICATIONS

Weinmueller, C., "International Search Report", mailed Apr. 4, 2022, issued in corresponding PCT Application No. PCT/EP2021/084071, filed Dec. 2, 2021 with a copy of an English translation of the ISR.

(Continued)

*Primary Examiner* — Tarun Sinha
(74) *Attorney, Agent, or Firm* — PERRY + CURRIER INC.

(57) ABSTRACT

The invention relates to a method for matching the operation of an individualizing device and the operation of a portioning device of an agricultural dispensing machine to each other in order to achieve a specified local depositing ratio when depositing seeds individualized by the individualizing device and fertilizer portions produced by the portioning device on a usable agricultural area, having the steps of: depositing individualized seeds and produced fertilizer portions onto the usable agricultural area using the agricultural (Continued)

dispensing machine as part of a calibration drive and detecting the depositing positions of the seeds and fertilizer portions deposited during the calibration drive and/or the local depositing relationship thereof using a mobile testing device.

11 Claims, 4 Drawing Sheets

(56) References Cited

U.S. PATENT DOCUMENTS

| | | | |
|---|---|---|---|
| 2004/0231575 A1* | 11/2004 | Wilkerson | A01C 7/06 111/127 |
| 2018/0014457 A1 | 1/2018 | Mertlich et al. | |
| 2018/0359909 A1 | 12/2018 | Conrad et al. | |
| 2022/0100731 A1* | 3/2022 | Tirapu Azpiroz | G01N 33/02 |

FOREIGN PATENT DOCUMENTS

| | | |
|---|---|---|
| DE | 102019104293 A1 | 8/2020 |
| DE | 102019128003 A1 | 4/2021 |
| WO | WO-2014186041 A1 | 11/2014 |

OTHER PUBLICATIONS

Search Report DPMA, dated Oct. 14, 2021, issued in corresponding German PatentApplication No. DE 102020133877.2.

Weinmueller, C., "International Preliminary Report on Patentability", mailed Mar. 3, 2023, ssued in corresponding PCT Application No. PCT/EP2021/084071, filed Dec. 2, 2021.

CIPO, Examination Report, Oct. 17, 2024 re CA Patent application No. 3200933.

* cited by examiner

METHOD FOR MATCHING THE OPERATION OF AN INDIVIDUALIZING DEVICE AND THE OPERATION OF A PORTIONING DEVICE TO EACH OTHER

The invention relates to a method for matching the operation of an individualizing device and the operation of a portioning device of an agricultural dispensing machine to each other.

Agricultural dispensing machines, the dispensing units of which have an individualizing device for individualizing seeds and a portioning device for producing fertilizer portions, are increasingly used for simultaneously depositing individualized seeds and fertilizer portions onto a usable agricultural area.

Fertilizer portions produced by means of a portioning device of an agricultural dispensing machine can have different machine-internal conveying durations in the dispensing machine and/or different machine-external flight times after dispensation by the dispensing machine, depending on the properties of the fertilizer. For example, the size, the weight and the surface texture of the fertilizer grains can have a bearing on the machine-internal duration of conveying the fertilizer portion in the dispensing machine and/or can have a bearing on the machine-external flight time of the fertilizer portion after dispensation by the dispensing machine.

Seeds individualized by means of an individualizing device of an agricultural dispensing machine can also have different machine-internal conveying durations in the dispensing machine and/or different machine-external flight times after dispensation by the dispensing machine, depending on the properties of the seed. For example, the size, the weight and the surface texture of the seeds can have a bearing on the machine-internal duration of conveying an individualized seed in the dispensing machine and/or can have a bearing on the machine-external flight time of an individualized seed after dispensation by the dispensing machine. For example, etchant can have a bearing on the machine-internal conveying duration and the machine-external flight time of seeds.

In order to be able to dispense different fertilizer/seed combinations with an agricultural dispensing machine, it is necessary for the operation of the individualizing device and the operation of the portioning device to be matched to each other as part of a calibration process, such that a desired local depositing relationship, for example a specified longitudinal distance, of the seeds and of the fertilizer portions on the usable agricultural area is achieved.

The object underlying the invention is thus to allow for setting a specified local depositing relationship of seeds and fertilizer portions for different fertilizer/seed combinations on an agricultural dispensing machine.

The object is achieved by a method of the type mentioned at the beginning, wherein seeds individualized and fertilizer portions produced as part of a calibration drive are deposited onto the usable agricultural area by means of the agricultural dispensing machine, and the depositing positions of the seeds and fertilizer portions deposited during the calibration drive and/or the local depositing relationship thereof are detected by means of a mobile testing device. A control system that is connected in a signal-conducting manner to the individualizing device and/or portioning device provides an operating behavior at least temporarily for the individualizing device and/or portioning device to achieve the specified local depositing relationship of seeds and fertilizer portions, which operating behavior is determined by the control system on the basis of the depositing positions of the seeds and fertilizer portions detected by means of the testing device and/or on the basis of the local depositing relationship thereof.

The operation of the individualizing device and the operation of the portioning device can be matched to each other particularly precisely if the matching is based on the actual local depositing relationship of the seeds and the fertilizer portions after deposition onto the usable agricultural area. In this case, both the machine's internal conveying behavior and the machine-external flight behavior of the seeds and fertilizer portions as well as further parameters, such as the deflection of the fertilizer coulter or soil conditions, are taken into account. As a result of the at least temporary specification of an operating behavior for the individualizing device and/or portioning device by the control system, the specified local depositing relationship is achieved despite the seed-specific machine-internal conveying duration of the individualized seed in the dispensing machine and/or the seed-specific machine-external flight time of the individualized seeds after dispensation by the dispensing machine and the fertilizer-specific machine-internal conveying duration of the produced fertilizer portions in the dispensing machine and/or the fertilizer-specific machine-external flight time of the produced fertilizer portions after dispensation by the dispensing machine. The operation of the individualizing device and the operation of the portioning device can be matched to each other before or during the dispensing process. The specified local depositing relationship can be an intended longitudinal distance between the individualized seeds and the produced fertilizer portions on the usable agricultural area. The intended longitudinal distance between the individualized seeds and the produced fertilizer portions can also be zero, so that the individualized seeds and the produced fertilizer portions have no distance from one another in the longitudinal direction. In principle, the individualized seeds and the produced fertilizer portions can also be deposited at a distance from one another at different deposition depths and/or in the transverse direction.

For example, the longitudinal offset between the fertilizer portions and seeds deposited during the calibration drive onto the usable agricultural area can be determined by means of the testing device. If the longitudinal offset determined by means of the testing device deviates from the intended longitudinal distance between the individualized seeds and the produced fertilizer portions, the latter must be set before the actual dispensing process by specifying an operating behavior for the individualizing device and/or portioning device. Thus, if the intended longitudinal distance between the individualized seeds and the produced fertilizer portions is zero and the seeds and fertilizer portions deposited during the calibration drive have a longitudinal distance from one another, this longitudinal distance must be eliminated by specifying an operating behavior for the individualizing device and/or portioning device, such that there is no longitudinal offset between the deposited seeds and fertilizer portions on the usable agricultural area during the actual dispensing process.

The control system may comprise an electronic control unit and/or an electronic operating unit. The electronic control unit can be part of the agricultural dispensing machine. The electronic control unit can be a job computer which is connected in a signal-conducting manner to the individualizing device and/or portioning device. The electronic control unit can generate control signals for the individualizing device and/or portioning device, via which an operating behavior can be specified for the individualizing device and/or portioning device, at least temporarily. The electronic operating unit can be a terminal, for example.

In addition, a method according to the invention is advantageous in which the seeds individualized by the individualizing device are dispensed by the individualizing device, in particular into a grain conveyor line, at grain discharge times that are spaced apart from one another. Alternatively or additionally, the fertilizer portions produced by the portioning device are dispensed by the portioning device, in particular into a fertilizer conveyor line, at fertilizer discharge times that are spaced apart from one another. The operating behavior specified by the control system preferably causes an adjustment of the time offset between the grain discharge times and the fertilizer discharge times. Adjustment of the time offset between the grain discharge times and the fertilizer discharge times changes the local depositing relationship of the seeds and the fertilizer portions, in particular their longitudinal distance, on the usable agricultural area. Adjustment of the time offset between the grain discharge times and the fertilizer discharge times therefore results in an adaptation of the dispense cycle of the individualizing device and the dispense cycle of the dispensing device to each other. For individualizing seeds, the individualizing device has, for example, a rotationally driven individualizing element. The individualizing element is driven by a drive of the individualizing device. The drive of the individualizing device can be an electromotive, pneumatic or hydraulic drive. The specified operating behavior can comprise control specifications for the drive of the individualizing device. For producing fertilizer portions, the portioning device has, for example, a rotationally driven portioning element. The portioning element is driven by a drive of the portioning device. The drive of the portioning device can be an electromotive, pneumatic or hydraulic drive. The specified operating behavior can comprise control specifications for the drive of the portioning device. The operating behavior specified by the control system can cause, for example, a temporary deviation from an intended speed ratio of the individualizing element and portioning element. The temporary deviation from the intended speed ratio of the individualizing element and portioning element changes the time offset between the grain discharge times and the fertilizer discharge times, so that, for example, a specified longitudinal distance between the individualized seeds and the produced fertilizer portions on the usable agricultural area is set. Alternatively, the portioning device for producing fertilizer portions can also comprise a portioning valve which discharges a fertilizer portion when opened, in particular into a fertilizer conveyor line. In this case, the fertilizer discharge times correspond to the valve opening times. By adjusting the valve opening times, the time offset between the grain discharge times and the fertilizer discharge times can thus also be changed and the longitudinal distance of the seeds and fertilizer portions on the usable agricultural area can thus be adjusted.

In a further preferred embodiment of the method according to the invention, depositing parameters can be set on the agricultural dispensing machine, which influence the depositing positions of the deposited seeds and fertilizer portions and/or the local depositing relationship thereof, wherein the depositing parameters correspond during the calibration drive and a dispensing process following the calibration drive. The depositing parameters can relate, for example, to the driving speed, the sowing strength, the individualizing air pressure in the individualizing device and/or the fertilizer volume of a fertilizer portion. If the depositing parameters correspond during the calibration drive and during the subsequent dispensing process, the operation of the individualizing device and the operation of the portioning device can be directly matched to one another on the basis of the distance data detected by means of the testing device, following the dispensing process after the calibration drive.

The method according to the invention is further advantageously developed in that depositing parameters can be set on the agricultural dispensing machine, which influence the depositing positions of the deposited seeds and fertilizer portions and/or the local depositing relationship thereof, wherein at least one depositing parameter, in particular the driving speed, deviate from one another during the calibration drive and a dispensing process following the calibration drive. For example, the depositing parameters except for the driving speed correspond during the calibration drive and during the dispensing process following the calibration drive and relate to a preferred parameter combination. When determining the required operating behavior(s) of the individualizing device and/or portioning device, the control system takes into account the depositing parameters that differ from one another during the calibration drive and during the dispensing process following the calibration drive. In this way, it is possible, for example, for the calibration drive to take place at a different driving speed than the dispensing process after the calibration drive. Due to the fact that the control system takes into account the depositing parameters differing from one another during the calibration drive and during the dispensing process following the calibration drive during its determination of the required operating behavior(s) of the individualizing device and/or portioning device, a change in the driving speed during the dispensing process can also take place, for example, without a calibration drive being required again for implementing the specified local depositing relationship of seeds and fertilizer portions on the usable agricultural area. When determining the operating behaviors to be specified, the control system can take into account, for example, a speed-dependent correction factor or a correction curve. As a result, the intended local depositing relationship during the later dispensing process can be maintained even during an acceleration or during a braking operation.

In addition, a method according to the invention is advantageous in which depositing parameters can be set on the agricultural dispensing machine, which influence the depositing positions of the deposited seeds and fertilizer portions and/or the local depositing relationship thereof, wherein at least one depositing parameter is changed during the calibration drive. By changing specific depositing parameters during the calibration drive, it can be determined how changing this depositing parameter affects the local depositing relationship of seeds and fertilizer portions. For example, a plurality of different driving speeds can be set during the calibration drive in order to detect the influence of the driving speed on the local depositing relationship of seeds and fertilizer portions.

Furthermore, a method according to the invention is advantageous in which the control system determines the operating behavior, which is specified at least temporarily to the individualizing device and/or portioning device, as a function of at least one calibration value, wherein the at least one calibration value is determined by the control system and/or testing device from the depositing positions of the seeds and fertilizer portions and/or from their local depositing relationship detected by means of the testing device. The mobile testing device is used, for example, to determine the longitudinal distances between the deposited seeds and the deposited fertilizer portions. The longitudinal distance determination preferably takes place via several seeds and fertilizer portions, so that variations of the longitudinal distribution are taken into account. For example, a mean longitudinal distance can be calculated from the plurality of longitudinal distance measurements, on the basis of which the calibration value is then determined. The mobile testing device can comprise a distance measuring device, for example a measuring rod or a measuring tape, by means of which the longitudinal distance of seeds or fertilizer portions can also be manually detected by an operator. The operator can then average the detected longitudinal distances himself, wherein the averaging of the detected longitudinal distances can also be performed by the control system.

In another preferred embodiment of the method according to the invention, the mobile testing device comprises an electronic measuring wheel and an actuator, wherein the measuring wheel is moved along a depositing path by an operator and the depositing positions of the seeds and fertilizer portions and/or the local depositing relationship thereof are detected by manual actuation of the actuator. The actuator can comprise two buttons, for example. The depositing positions of the seeds can be detected with a first button. The depositing positions of the fertilizer portions can be detected with a second button. The mobile testing device can then calculate the calibration value on the basis of actuating the actuator. The mobile testing device can detect spots where no seed or twice as much seed has been dispensed and consider this accordingly in the calculation of the calibration value. When calculating the calibration value, the mobile testing device can furthermore take into account a coefficient of variation of the seed and/or fertilizer in order to rule out errors. The coefficient of variation is a relative measure of dispersion and relates here to the longitudinal deviation. The mobile testing device can comprise optical aids in order to enable a particularly precise detection of the depositing positions of the seeds and/or fertilizer portions along the depositing path. The optical aids can comprise a pointer in the direction of the depositing path or a marking projected onto the depositing path, so that parallax errors are avoided as far as possible during detection of the depositing positions.

In a further development of the method according to the invention, the mobile testing device is an electronic image recording device, wherein the depositing positions of the seeds and fertilizer portions deposited during the calibration drive and/or the local depositing relationship thereof are detected by evaluating one or more images of the seeds and fertilizer portions deposited during the calibration drive and recorded by the mobile testing device. The mobile testing device is, for example, a mobile radio device on which an application for determining the depositing positions of the seeds and fertilizer portions deposited during the calibration drive and/or the local depositing relationship thereof is installed. The depositing positions of the seeds and fertilizer portions deposited during the calibration drive and/or the local depositing relationship thereof can be acquired via individual images or via one or more videos. The evaluation of the one or more image recordings preferably comprises an image analysis. Since it can be difficult for image processing to determine the grain and the center of the fertilizer portion, grain and fertilizer portion can also be marked in the image by the operator. It may be necessary for a scale object to be located in the image so that the spacing can be calculated and the calibration value can be determined.

In a further preferred embodiment of the method according to the invention, the depositing positions of the seeds and fertilizer portions deposited during the calibration drive, the local depositing relationship thereof and/or a calibration value determined therefrom are transmitted by data transmission from the mobile testing device to the control system. The transmission can be wireless or wired. Transmission takes place, for example, via Bluetooth, W-LAN and/or the Internet. The data are preferably received by a terminal of the control system, so that the terminal determines a suitable operating behavior for the portioning device and/or individualizing device on the basis of the depositing positions of the seeds and fertilizer portions deposited during the calibration drive, the local depositing relationship thereof and/or the calibration value determined therefrom. The terminal can then communicate the determined operating behavior to an electronic control unit of the agricultural dispensing machine, wherein the electronic control unit generates corresponding control signals for the individualizing device and/or portioning device for implementing the operating behavior and transmits the individualizing device and/or portioning device. Alternatively or additionally, the depositing positions of the seeds and fertilizer portions deposited during the calibration drive, the local depositing relationship thereof and/or a calibration value determined therefrom can be manually input by the operator on an input device, in particular a terminal, of the control system.

In an alternative embodiment of the method according to the invention, the individualized seeds are deposited onto the usable agricultural area during the calibration drive by a grain deposition device of the agricultural dispensing machine, wherein the grain deposition device can be moved into a dispensing configuration in which coverage of the deposited seeds with soil takes place, and into a calibration drive configuration in which at least approximately no coverage of the deposited seeds with soil takes place, wherein the grain deposition device is in the calibration drive configuration during the calibration drive. Since the seed furrow, into which the seeds are deposited, collapses in part on its own, coverage of the seeds with soil cannot be fully avoided in practice. In the calibration drive configuration, however, the seeds are prevented from being actively covered with soil by the grain deposition device. The grain deposition device can be a seed drill coulter, for example. The grain deposition device can be in a lifted state in the calibration drive configuration. For example, the grain deposition device is guided just above the ground surface over the usable agricultural area. An element for closing the seed furrow can be deactivated in the calibration drive configuration. Lifting is not necessary in this case, so that the seeds can be deposited at the intended deposition depth. In the calibration drive configuration, the deposition depth of the grain deposition device can be reduced so that less soil has to be moved to expose the seeds while the capturing process corresponds approximately to conventional deposition. Another position of the grain deposition device can be set by means of a delimiting device in the calibration drive configuration. Additional elements for opening the seed furrow or for keeping it clear, by means of which elements the seeds remain visible directly after the calibration drive, can also be activated or attached in the calibration drive configuration. A kind of fabric, mat or film can be laid out on the usable agricultural area prior to the calibration drive. The machine travels at the target speed and the desired deposition depths over the fabric, mat or film and presses the material into the soil so that the seeds are caught and fixed transversely to the direction of travel by the fabric, mat or film. Following this drive, the fabric, mat or film can be laterally elongated again or partially folded open without the deposited grains mixing with the soil. As a result, no soil has to be exposed and the seeds are prevented from protruding or from being buried.

In another preferred embodiment of the method according to the invention, the produced fertilizer portions are deposited onto the usable agricultural area during the calibration drive by a fertilizer deposition device of the agricultural dispensing machine, wherein the fertilizer deposition device can be moved into a dispensing configuration in which coverage of the deposited fertilizer grains with soil takes place, and into a calibration drive configuration in which a reduced coverage of the deposited fertilizer portions with soil takes place, wherein the fertilizer deposition device is in the calibration drive configuration during the calibration drive. A slight coverage with soil is to be implemented also in the calibration drive configuration since otherwise the fertilizer portion will be excessively distributed due to the lack of a sufficient capture effect, so that no bundled batchwise discharge of the fertilizer will take place. As a result of the reduced coverage of the deposited fertilizer portions, however, the workload during exposure is greatly reduced. The fertilizer deposition device can be a fertilizer coulter, for example. The fertilizer deposition device can be in a lifted state in the calibration drive configuration. For example, the fertilizer deposition device is guided just above the ground surface of the usable agricultural area. An element for closing the fertilizer furrow can be deactivated in the calibration drive configuration. Lifting is not necessary in this case, so that the fertilizer can be deposited at the intended deposition depth. In the calibration drive configuration, the deposition depth of the fertilizer deposition device can be reduced so that less soil has to be moved to expose the fertilizer portions while the capturing process corresponds approximately to conventional deposition. Another position of the fertilizer deposition device can be set by means of a delimiting device in the calibration drive configuration. Additional elements for opening the fertilizer furrow or for keeping it clear, by means of which elements the fertilizer portions remain visible directly after the calibration drive, can also be activated or attached in the calibration drive configuration. A kind of fabric, mat or film can be laid out on the field prior to the calibration drive. The machine travels at the target speed and the desired deposition depths over the fabric, film or mat and presses the material into the soil so that the fertilizer portions are caught and fixed transversely to the direction of travel by the fabric, mat or film. Following this drive, the fabric, mat or film can be laterally elongated again or partially folded open without the deposited portions mixing with the soil. As a result, no soil has to be exposed and fertilizer portions are prevented from being overlooked or being buried.

The object underlying the invention is further achieved by a calibration system of the type mentioned at the beginning, wherein, in order to achieve the specified local depositing relationship, the control system of the calibration system according to the invention is configured to provide at least temporarily an operating behavior to the individualizing device and/or portioning device, which operating behavior is determined by the control system on the basis of the depositing positions of the seeds and fertilizer portions and/or the local depositing relationship thereof, as detected by means of the testing device.

In a preferred embodiment, the calibration system according to the invention is configured to be used for carrying out the method according to one of the embodiments described above. Therefore, as regards the advantages and modifications of the calibration system according to the invention, reference is made to the advantages and modifications of the method according to the invention.

Preferred embodiments of the invention are explained and described in more detail below with reference to the accompanying drawings, in which.

Figure 1:
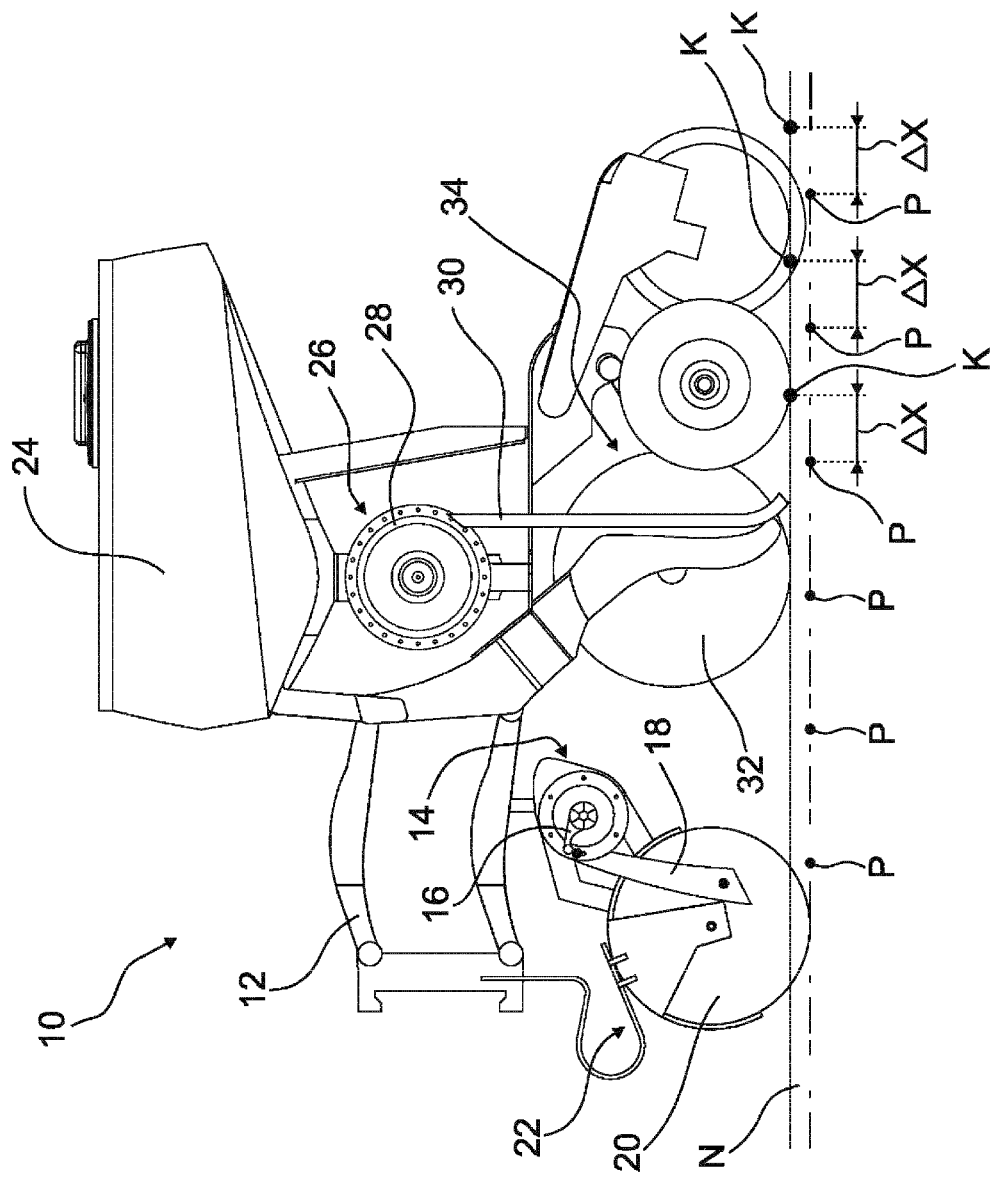
FIG. 1 shows a dispensing unit in which the operation of the individualizing device and the operation of the portioning device can be matched to each other by means of the method according to the invention.

FIG. 1 shows a dispensing unit 10 of an agricultural dispensing machine, by means of which fertilizer can be dispensed in the form of fertilizer portions P and seed can be dispensed in the form of individualized seeds K, in a coordinated manner, on a usable agricultural area N. The agricultural dispensing machine preferably has several of the illustrated dispensing units 10, which are arranged next to one another in the transverse direction, i.e., transversely to the direction of travel.

The illustrated dispensing unit 10 has a holder 12 which comprises a parallelogram linkage and by means of which the dispensing unit 10 can be fastened to a crossbeam of the agricultural dispensing machine.

The dispensing unit 10 further comprises a portioning device 14, by means of which fertilizer portions P can be produced. The portioning device 14 has a drive which rotationally drives a portioning element 16 designed as a portioning wing. The drive of the portioning device 14 can be an electromotive, hydraulic or pneumatic drive.

The portioning element 16 rotating in the housing of portioning device 14 collects the fertilizer continuously entering the housing of portioning device 14 and thus produces a fertilizer portion P during each rotation. The fertilizer portions P produced by the portioning device 14 are discharged from the portioning device 14 into a fertilizer conveyor line 18 due to the rotational movement of the portioning element 16 at fertilizer discharge times that are spaced apart from one another. The fertilizer conveyor line 18 is an ejection channel via which the produced fertilizer portion P is first conveyed, within the machine, in the direction of the usable agricultural area N. After leaving the fertilizer conveyor line 18, the produced fertilizer portion P is initially in a flight phase before the fertilizer portion P reaches the base of a fertilizer furrow. The fertilizer furrow is produced by means of a fertilizer coulter 22, wherein the fertilizer coulter 22 can be a double disk coulter having two cutting disks 20.

The dispensing unit 10 further comprises an individualizing device 26, by means of which the seeds K stored in the storage container 24 can be individualized. For this purpose, the individualizing device 26 has a drive which rotationally drives the individualizing element 28 of the individualizing device 26, which individualizing element 28 is designed as an individualizing disc. The drive of the individualizing device 26 can be an electromotive, pneumatic or hydraulic drive.

The individualizing element 28 designed as an individualizing disc has grain receiving recesses, which each receive one seed grain, thus individualizing them. The individualized seeds K are then discharged from the individualizing device 26 into a grain conveyor line 30 at grain discharge times that are spaced apart from one another. The grain conveyor line 30 is an ejection channel and serves to convey the individualized seeds K in the direction of the usable agricultural area N. After leaving the grain conveyor line 30, the individualized seeds K are initially in a flight phase before they reach the base of a seed furrow. The seed furrow is produced by one or more cutting disks 32 of the seed drill coulter 34.

The produced fertilizer portions P can have different machine-internal conveying durations in the dispensing machine and different machine-external flight times after dispensation by the dispensing machine, depending on the properties of the fertilizer. For example, the size, the weight and the surface properties of the fertilizer grains can have a bearing on the machine-internal conveying duration and the machine-external flight time of the fertilizer portions. The individualized seeds K can also have different machine-internal conveying durations in the dispensing machine and/or different machine-external flight times after dispensation by the dispensing machine, depending on the properties of the seed. For example, the size, the weight and the surface properties of the seeds K can have a bearing on the machine-internal conveying duration and the machine-external flight time of the individualized seeds K.

To achieve a specified local depositing relationship $\Delta x$ of the seeds K and the fertilizer portions P on the usable agricultural area N, the operation of the individualizing device 26 and the operation of the portioning device 14 must be matched to each other. The specified depositing relationship $\Delta x$ can be, for example, a specified longitudinal distance between the fertilizer portions P and the seeds K, wherein the specified longitudinal distance can also be zero, so that the individualized seeds K and the produced fertilizer portions P show no distance from one another in the longitudinal direction. To adjust the longitudinal distance $\Delta x$ between the deposited individualized seeds K and the deposited produced fertilizer portions P, an operating behavior is specified at least temporarily to the portioning device 14 and/or the individualizing device 26 by a control system 52 (cf. FIGS. 2 & 3). By means of the operating behavior specified to the portioning device 14 and/or the individualizing device 26 by the control system 52, an adjustment of the time offset between the grain discharge times at the individualizing device 26 and the fertilizer discharge times at the portioning device 14 is initiated. In the illustrated dispensing unit 10, this can take place in that a temporary deviation from an intended speed ratio of the individualizing element 28 and portioning element 16 is initiated via the operating behavior specified by the control system 52, so that the longitudinal distance $\Delta x$ between the fertilizer portions P and the seeds K changes.

Figure 2:
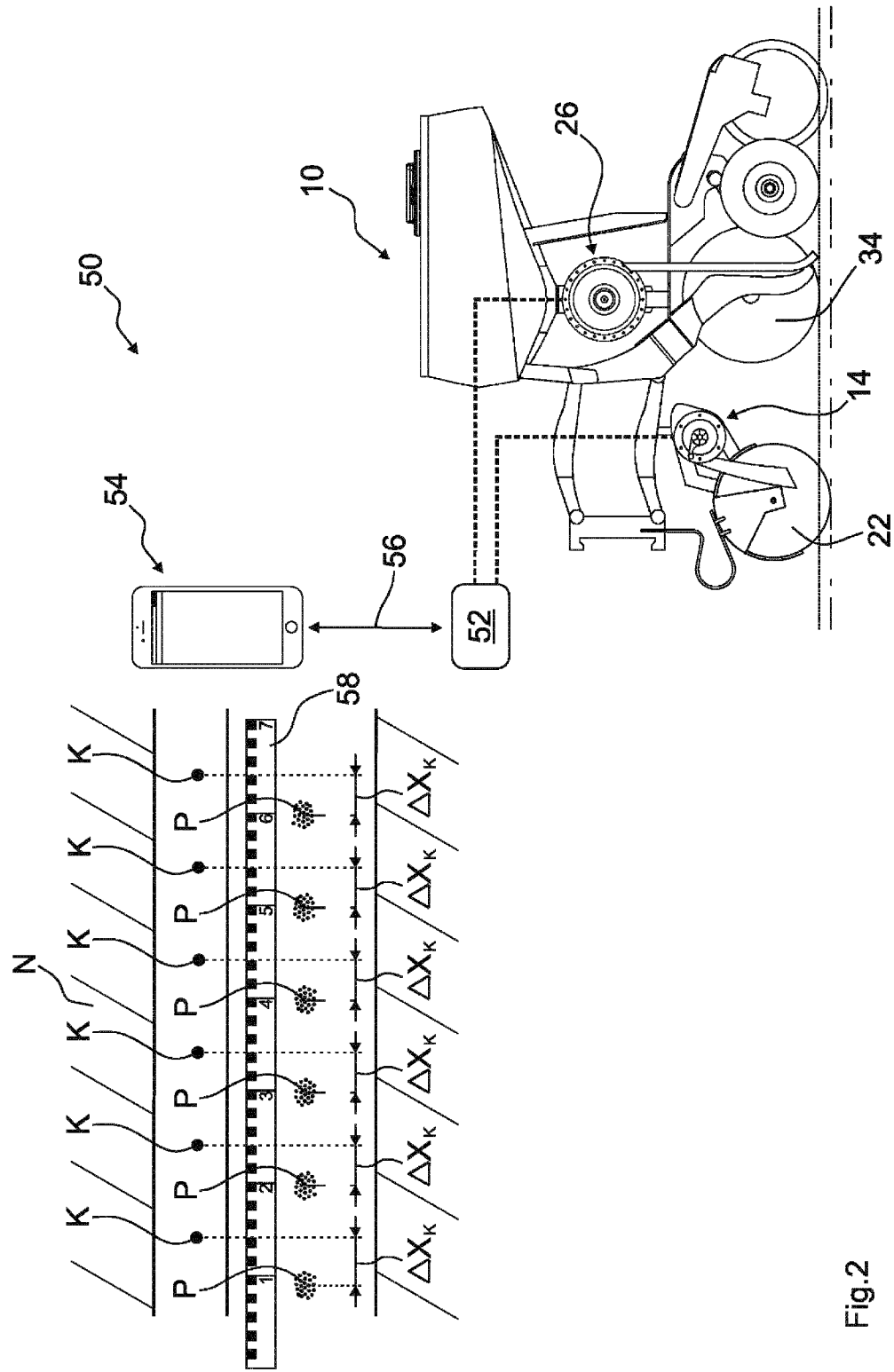
FIG. 2 shows a schematic representation of an exemplary embodiment of the calibration system according to the invention.
Figure 3:
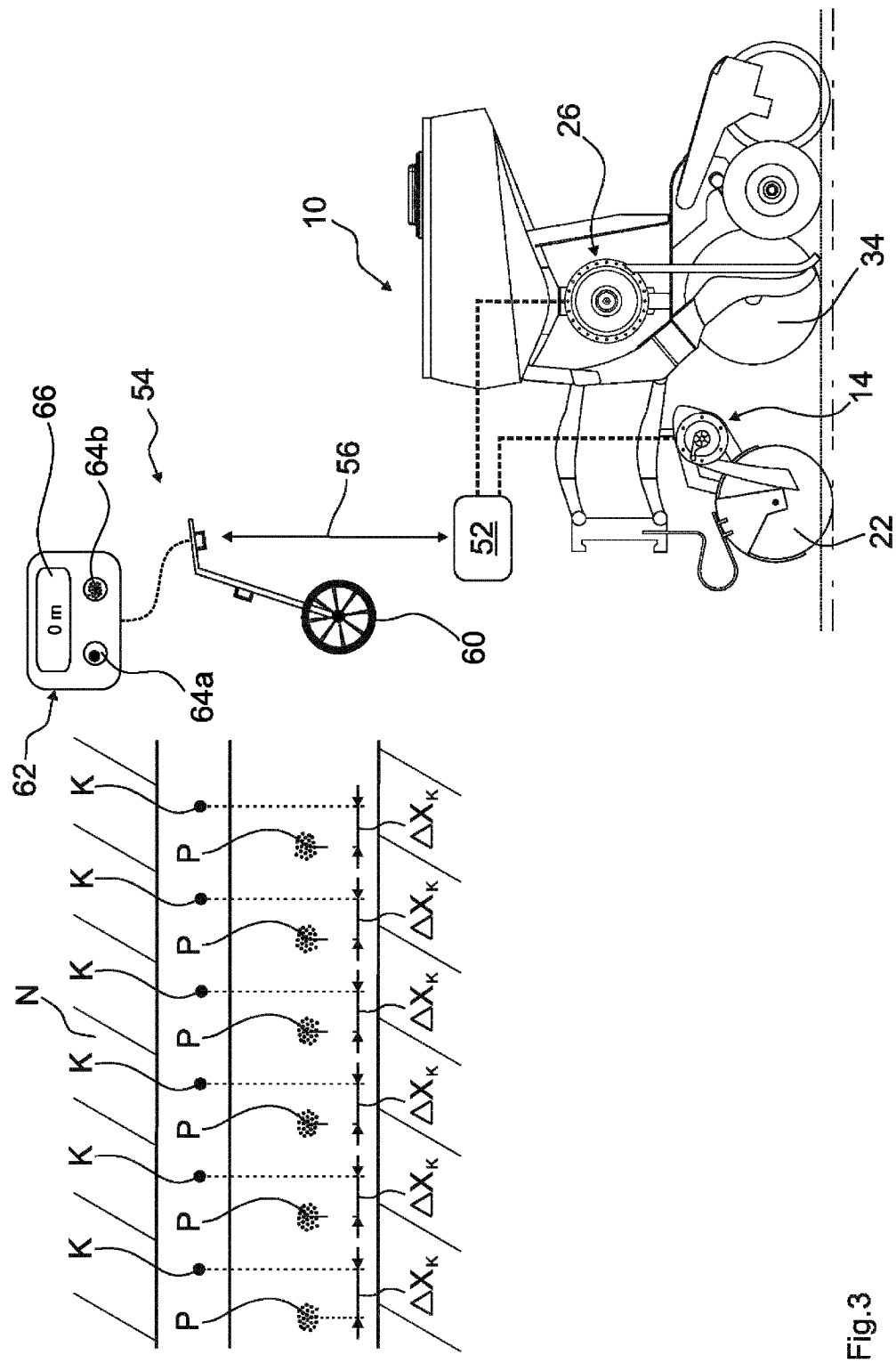
FIG. 3 shows a schematic representation of another exemplary embodiment of the calibration system according to the invention.

FIGS. 2 and 3 show calibration systems 50, the control systems 52 of which at least temporarily specify an operating behavior to a portioning device 14 and/or individualizing device 26, in order to achieve a specified local depositing relationship $\Delta x$ of seeds K and fertilizer portions P on the usable agricultural area N.

To achieve the specified local depositing relationship $\Delta x$ of seeds K and fertilizer portions P on the usable agricultural area N, it is first necessary to perform a calibration drive by means of the agricultural dispensing machine. During the calibration drive, seeds K individualized by the individualizing device 26 and fertilizer portions P produced by the portioning device 14 are deposited onto the usable agricultural area N. FIGS. 2 and 3 each show a deposition pattern of seeds K and fertilizer portions P, which pattern was produced as part of a calibration drive. Depositing parameters can be set on the agricultural dispensing machine which influence the depositing positions $P_K$, $P_P$ of the deposited seeds K and fertilizer portions P. These depositing parameters are, for example, the driving speed, the sowing strength, the individualizing air pressure at the individualizing device 26 and the fertilizer volume of a fertilizer portion P. The deposition parameters of the dispensing machine that are set during the calibration drive and during a dispensing process following the calibration drive correspond, except for the driving speed. However, the calibration drive is carried out at a driving speed which deviates from the planned driving speed during the dispensing process following the calibration drive. A plurality of different driving speeds are set during the calibration drive. The grain deposition device of the agricultural dispensing machine designed as a seed drill coulter 34 and the fertilizer deposition device of the agricultural dispensing machine designed as a fertilizer coulter 22 are in a calibration drive configuration during the calibration drive. When the seed drill coulter 34 is in the calibration drive configuration, only slight coverage of the deposited seeds K with soil takes place. When the fertilizer coulter 22 is in the calibration drive configuration, reduced coverage of the deposited fertilizer portions P with soil takes place. Due to the calibration drive configuration of the seed drill coulter 34 and fertilizer coulter 22, less soil must be moved to expose the deposited seeds K and fertilizer portions P so that the exposure of the deposited seeds K and fertilizer portions P is simplified.

After depositing the seeds K and fertilizer portions P during the calibration drive, the seeds K and fertilizer portions P are to be initially exposed such that the depositing positions $P_K$ of the seeds K and the depositing positions $P_P$ of the fertilizer portions P can be optically or visually detected. As a result of the depositing positions $P_K$, $P_P$ of the seeds K and fertilizer portions P now being visible, the local depositing relationship $\Delta x_K$, in this case the longitudinal distance, between the deposited seeds K and fertilizer portions P can be optically or visually detected. The depositing positions $P_K$, $P_P$ of the seeds K and fertilizer portions P deposited during the calibration drive and/or the local depositing relationship $\Delta x_K$ thereof are detected by means of a mobile testing device 54.

In the calibration system 50 shown in FIG. 2, the mobile testing device 54 is an electronic image recording device, namely a smartphone. After performing the calibration drive, one or more image recordings of the deposited seeds K and fertilizer portions P are generated by means of the mobile testing device 54. The depositing positions $P_K$, $P_P$ of the seeds K and fertilizer portions P deposited during the calibration drive and the local depositing relationship $\Delta x_K$ thereof are detected by evaluating the image recordings of the mobile testing device 54. An application is installed on the mobile testing device 54, which application performs an image analysis of the image recordings generated with the mobile testing device 54 in order to detect the depositing positions $P_K$, $P_P$ of the seeds K and fertilizer portions P. The application can identify the seeds K and fertilizer portions P either independently or require a previous marking of the corresponding depositing positions $P_K$, $P_P$ by an operator. In order to determine the longitudinal distance $\Delta x_K$, it may be necessary for the application on the mobile testing device 54 to require a reference strip 58 arranged in the vicinity of the seeds K and fertilizer portions P, which reference strip 58 has markings serving as a length or distance reference.

The depositing positions $P_K$, $P_P$ of the seeds K and fertilizer portions P deposited during the calibration drive, the local depositing relationship $\Delta x_K$ thereof and/or a calibration value determined therefrom are subsequently transmitted from the mobile testing device 54 to the control system 52 by data transmission via the signal-conducting connection 56. In principle, the transmission can be wireless or wired, wherein, for example, Bluetooth, W-LAN and the Internet can be used for data transmission. The data are transmitted from the mobile testing device 54 either first to a terminal of the control system 52 or directly to an electronic control unit of the control system 52, which is part of the agricultural dispensing machine.

The control system 52, which is connected in a signal-conducting manner to the individualizing device 26 and portioning device 14, determines an operating behavior for the individualizing device 26 and/or portioning device 14 on the basis of the depositing positions $P_K$, $P_P$ of the seeds K and fertilizer portions P and/or the local depositing relationship $\Delta x_K$ thereof detected by means of the testing device 54, via which operating behavior the specified local depositing relationship $\Delta x$ of seeds K and fertilizer portions P can be achieved. The specified local depositing relationship $\Delta x$ of the seeds K and fertilizer portions P can relate, for example, to the longitudinal distance thereof, wherein the specified longitudinal distance between the seeds K and fertilizer portions P can also be zero.

To achieve the specified local depositing relationship $\Delta x$ of the seeds K and fertilizer portions P, the control system 52 can, for example, initiate a temporary deviation from an intended speed ratio of the individualizing element 28 of the individualizing device 26 and the portioning element 16 of the portioning device 14.

In the calibration system 50 shown in FIG. 3, the mobile testing device 54 has an electronic measuring wheel 60 and an actuator 62. The measuring wheel 60 is moved by an operator along a depositing path in order to detect the depositing positions $P_K$, $P_P$ of the seeds K and fertilizer portions P deposited during a calibration drive and the local depositing relationship $\Delta x_K$ thereof by manual actuation of the actuator 62. The actuator 62 has two buttons 64a, 64b. The depositing positions $P_K$ of the seeds K can be detected with the first button 64a. The depositing positions $P_P$ of the fertilizer portions P can be detected with the second button 64b. The testing device 54 can furthermore have a display 66, via which the longitudinal distance $\Delta x_K$ between the fertilizer portions P and seeds K deposited during the calibration drive is displayed during position detection.

The mobile testing device 54 can then calculate a calibration value on the basis of the detected depositing positions $P_K$, $P_P$ of the seeds K and fertilizer portions P, which calibration value can then be used by the control system 52 to match the operation of the individualizing device 26 and the operation of the portioning device 14 to each other. During calibration value calculation, the mobile testing device 54 can consider spots where no seed or twice as much seed has been dispensed and can consider the coefficient of variation for depositing seed and fertilizer. The determined calibration value is then either transmitted via the signal-conducting connection 56 to the control system 52 or input manually by the operator on a terminal of the control system 52. In this case, the display 66 can also be used to represent the determined calibration value so that it can be read from the display 66 by the operator.

The control system 52 determines the operating behavior, which is specified to the individualizing device 26 and portioning device 14, as a function of the calibration value calculated by the testing device 54. Alternatively, the calibration value can also be calculated directly by the control system 52. In this case, the depositing positions $P_K$, $P_P$ of the seeds K and fertilizer portions P detected by the testing device 54 are transmitted from the testing device 54 to the control system 52.

Figure 4:
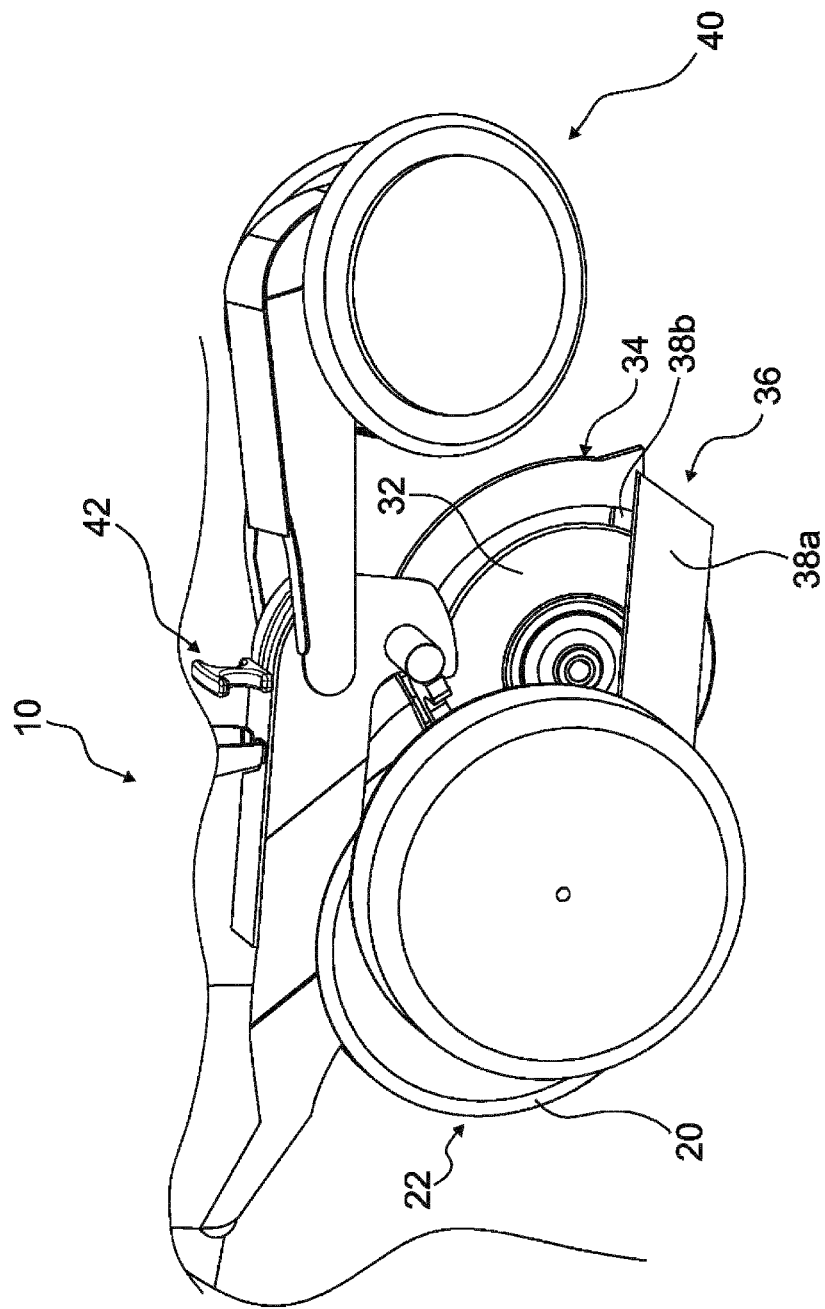
FIG. 4 shows a schematic representation of a dispensing unit, the grain deposition device of which can be moved into a dispensing configuration.

FIG. 4 shows a dispensing unit 10 which has a clearing device 36 in the region of the seed drill coulter 34. The clearing device comprises two clearing sheets 38a, 38b, each arranged laterally of the cutting disks 32 of the seed drill coulter 34, which serve to remove thrown-up soil from the seed furrow in the manner of a snowplow. The clearing device 36 is used during the calibration drive in order to avoid excessive coverage of the deposited seeds with soil. The dispensing unit 10 furthermore has an adjustment device 42, by means of which a furrow closer 40 can be lifted off the usable agricultural area N and locked in the lifted state. By lifting the furrow closer 40, active furrow closing during a calibration drive is avoided.

LIST OF REFERENCE SYMBOLS

10 Dispensing unit
12 Holder
14 Portioning device
16 Portioning element
18 Fertilizer conveyor line
20 Cutting disk
22 Fertilizer coulter
24 Storage container
26 Individualizing device
28 Individualizing element
30 Grain conveyor line
32 Cutting disk
34 Seed drill coulter
Clearing device 36
38a, 38b Clearing sheets
40 Furrow closer
42 Adjustment device
50 Calibration system
52 Control system
54 Testing device
56 Connection
58 Reference strip
60 Measuring wheel
62 Actuator
64a, 64b Buttons
66 Display
P Fertilizer portions
$P_P$ Depositing positions
$P_K$ Depositing positions
N Usable area
K Seeds
$\Delta x$ Depositing relationship
$\Delta x_K$ Depositing relationship

The invention claimed is:

1. A method for matching the operation of an individualizing device and the operation of a portioning device of an agricultural dispensing machine to each other in order to achieve a specified local depositing relationship when depositing seeds individualized by the individualizing device and fertilizer portions produced by the portioning device on a usable agricultural area, the method comprising:

depositing individualized seeds and produced fertilizer portions onto the usable agricultural area using the agricultural dispensing machine as part of a calibration drive; and detecting the depositing positions of the seeds and fertilizer portions deposited during the calibration drive and/or the local depositing relationship thereof using a mobile testing device;

wherein a control system that is connected in a signal-conducting manner to the individualizing device and/or portioning device provides an operating behavior at least temporarily for the individualizing device and/or portioning device to achieve the specified local depositing relationship of seeds and fertilizer portions, the operating behavior determined by the control system on the basis of the depositing positions of the seeds and fertilizer portions detected by means of the testing device and/or on the basis of the local depositing relationship thereof, and wherein:

the mobile testing device comprises an electronic measuring wheel and an actuator, wherein the measuring wheel is moved along a depositing path by an operator and the depositing positions of the seeds and fertilizer portions and/or the local depositing relationship thereof are detected by manual actuation of the actuator, or the mobile testing device comprises an electronic image recording device, wherein the depositing positions of the seeds and fertilizer portions deposited during the calibration drive and/or the local depositing relationship thereof are detected by evaluating one or more images of the seeds and fertilizer portions deposited during the calibration drive and recorded by the mobile testing device.

2. The method according to claim 1,
wherein: the seeds individualized by the individualizing device are dispensed by the individualizing device comprising a grain conveyor line, at grain discharge times that are spaced apart from one another; and/or
the fertilizer portions produced by the portioning device are dispensed by the portioning device comprising a fertilizer conveyor line, at fertilizer discharge times that are spaced apart from one another;
wherein the operating behavior specified by the control system causes an adjustment of the time offset between the grain discharge times and the fertilizer discharge times.

3. The method according to claim 1,
wherein depositing parameters are set on the agricultural dispensing machine, which influence the depositing positions of the deposited seeds and fertilizer portions and/or the local depositing relationship thereof, wherein the depositing parameters correspond during the calibration drive and a dispensing process following the calibration drive.

4. The method according to claim 1,
wherein depositing parameters are set on the agricultural dispensing machine, which influence the depositing positions of the deposited seeds and fertilizer portions and/or the local depositing relationship thereof, wherein at least one depositing parameter, including the driving speed, deviates from one another during the calibration drive and a dispensing process following the calibration drive.

5. The method according to claim 1,
wherein depositing parameters are set on the agricultural dispensing machine, which influence the depositing positions of the deposited seeds and fertilizer portions and/or the local depositing relationship thereof, wherein at least one depositing parameter is changed during the calibration drive.

6. The method according to claim 1,
wherein the control system determines the operating behavior, which is specified at least temporarily to the individualizing device and/or portioning device, as a function of at least one calibration value, wherein the at least one calibration value is determined by the control system and/or testing device from the depositing positions of the seeds and fertilizer portions and/or from their local depositing relationship detected by means of the testing device.

7. The method according to claim 1,
wherein the depositing positions of the seeds and fertilizer portions deposited during the calibration drive, the local depositing relationship thereof and/or a calibration value determined therefrom are transmitted from the mobile testing device to the control system by data transmission.

8. The method according to claim 1,
wherein the individualized seeds are deposited onto the usable agricultural area during the calibration drive by a grain deposition device of the agricultural dispensing machine, wherein the grain deposition device is moved into a dispensing configuration in which coverage of the deposited seeds with soil takes place, and into a calibration drive configuration in which at least approximately no coverage of the deposited seeds with soil takes place, wherein the grain deposition device is in the calibration drive configuration during the calibration drive.

9. The method according to claim 1,
wherein the produced fertilizer portions are deposited onto the usable agricultural area during the calibration drive by a fertilizer deposition device of the agricultural dispensing machine, wherein the fertilizer deposition device is moved into a dispensing configuration in which coverage of the deposited fertilizer portions with soil takes place, and into a calibration drive configuration in which reduced coverage of the deposited fertilizer portions with soil takes place, wherein the fertilizer deposition device is in the calibration drive configuration during the calibration drive.

10. A calibration system for an agricultural dispensing machine for achieving a specified local depositing relationship when depositing individualized seeds and produced fertilizer portions onto a usable agricultural area, the calibration system comprising:
an individualizing device for individualizing seeds;
a portioning device for producing fertilizer portions;
a mobile testing device, by means of which the depositing positions of seeds and fertilizer portions deposited during a calibration drive and/or the local depositing relationship thereof are detected; and
a control system which is connected in a signal-conducting manner to the individualizing device and/or portioning device and is configured to match the operation of the individualizing device and the operation of the portioning device to each other;
wherein, in order to achieve the specified local depositing relationship, the control system is configured to at least temporarily provide an operating behavior to the individualizing device and/or portioning device, the operating behavior determined by the control system on the basis of the depositing positions of the seeds and fertilizer portions detected by means of the testing device and/or on the basis of the local depositing relationship thereof, and wherein:
the mobile testing device comprises an electronic measuring wheel and an actuator, wherein the measuring wheel is moved along a depositing path by an operator and the depositing positions of the seeds and fertilizer portions and/or the local depositing relationship thereof are detected by manual actuation of the actuator, or the mobile testing device comprises an electronic image recording device, wherein the depositing positions of the seeds and fertilizer portions deposited during the calibration drive and/or the local depositing relationship thereof are detected by evaluating one or more images of the seeds and fertilizer portions deposited during the calibration drive and recorded by the mobile testing device.

11. The calibration system according to claim 10,
wherein the calibration system is configured to be used to perform the method according to claim 1.

* * * * *